March 24, 1970     F. SAMET     3,502,049
SCALE EXPANSION METHODS AND APPARATUS
Filed Sept. 11, 1968
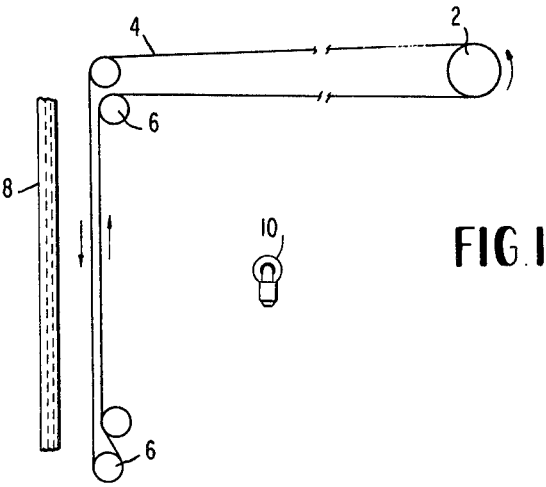
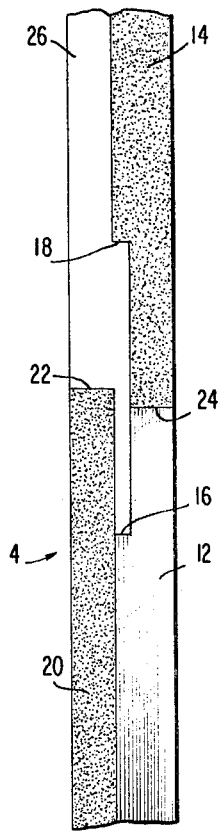
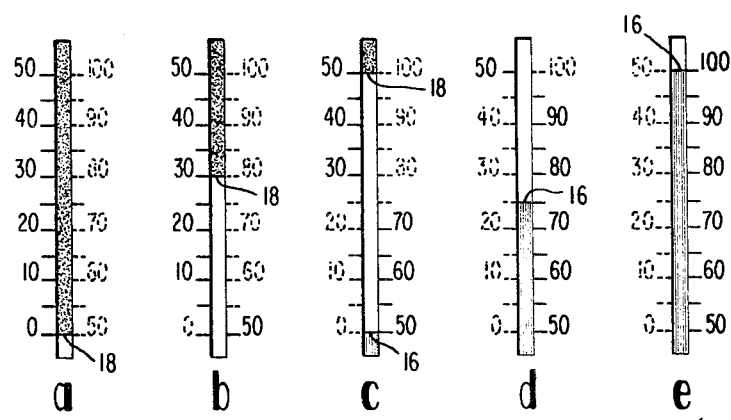
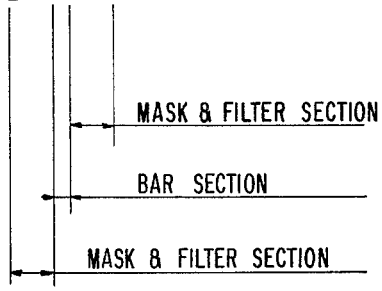
INVENTOR
FRANK SAMET
BY Levin E. Gregg
ATTORNEY

United States Patent Office 3,502,049
Patented Mar. 24, 1970

3,502,049
SCALE EXPANSION METHODS AND APPARATUS
Frank Samet, New York, N.Y., assignor to Simmonds
Precision Products, Inc., Tarrytown, N.Y., a corporation of New York
Filed Sept. 11, 1968, Ser. No. 759,153
Int. Cl. G09f 9/38
U.S. Cl. 116—135                                    4 Claims

ABSTRACT OF THE DISCLOSURE

A linear scale indicator utilizing a moving tape having a pattern of opaque and translucent areas thereon for transmitting a source of light to a transparent scale member having a slot therein and through which is viewable an indexing pointer marked on the tape. For different positions of the tape in response to an actuating member, the movement of which is to be measured, different portions of the scale member will be illuminated corresponding to the position of the indexing pointer on the tape.

---

This invention relates to indicators with a moving index along a stationary scale and more particularly to such indicators in which both resolution and legibility are increased without increasing the size of the overall indicator.

In conventional linear-scale indicators the normal construction employs an index pointer or bar which is movable along a stationary scale. In this case, the length of the scale is limited by the corresponding dimension of the dial and, accordingly, the resolution of such a scale is similarly limited. The need for a higher resolution, consequently, would necessitate the use of an oversize dial and also an oversize instrument case. Other linear-scale indicators have used a movable scale, for example, a belt or tape, while the index is maintained in a stationary position. In this case, the length of the scale, and hence its resolution, is not limited by the length of the dial. However, the necessity for close reading of the scale indications imposes an excessive strain on the observer, especially if a plural number of instruments are to be monitored. It is the purpose of this invention to combine the desirable feature of good legibility of the one type of indicator with the high resolution characterizing the other type of indicator, while at the same time minimizing the instrument to the size dictated by space requirements of modern component systems.

Accordingly, it is an object of this invention to provide a linear-scale indicator having high resolution and improved legibility which is compact in design and of simple construction.

It is another object of this invention to provide a linear-scale indicator which offers to the observer a critical portion of the scale while blocking out the remaining portion of the scale to thereby facilitate closer observation.

According to one embodiment employing the principles of this invention, there is provided a vertical scale dial plate member which is divided into two sections, a 0–50 section, for example, to the left or on one side of a slot provided in the dial, and a 50–100 section to the right or the other side of the slot in the dial plate. Supported behind the dial plate and viewable through the slot therein is a tape portion composed of transparent plastic, or the like, and is arranged to move vertically behind the dial plate and centered relative thereto. A pattern of opaque and translucent segments of distinctive colors is imprinted on the tape such that the tape is allowed to travel through a distance twice that of the length of the dial plate and owing to the pattern printed thereon only those segments of the scale on the dial plate are illuminated for a given range of observation. For this purpose, a suitable source of illumination is provided behind the tape. The tape is driven by a servomotor, or the like, the rotary output motion of which is being measured.

Other objects and advantages will become apparent from a detailed study of the following specification and drawings, in which:

FIG. 1 is a side elevational view showing the arrangement according to the principles of this invention, FIG. 2 is a plan view of the tape showing a pattern of opaque and translucent segments thereon, and FIGS. 3a–e illustrate the front face of the dial plate scale for various readings.

Referring now to FIG. 1, there is shown generally the overall system employing the concept of this invention. A suitable servomotor (not shown) has its output shaft connected to a sprocket 2. A tape 4 of transparent plastic material is positioned around the sprocket and driven thereby. Suitable rotors or idler wheels 6 are provided to support the tape 4 as shown. Positioned in vertical parallel alignment with the tape is a dial plate member 8 having associated therewith the scale ranges to be discussed below. Positioned behind the tape 4 is a source of illumination 10 for the purpose of illuminating the scale on the dial plate 8.

As shown in FIG. 2, the tape 4 is composed of a transparent material such as Mylar, or the like, and as shown has a prearranged pattern of translucent and opaque areas which define three parallel sections running the length of a portion of the tape to be viewed through the dial plate member 8, namely, two masking filter sections bordering the edges of the tape and a bar section located therebetween. As shown, one of the mask and filter sections is made up of a translucent colored area 12 and a black opaque area 14. Each of these areas has a portion thereof extending into the bar section of the tape to define indicator edges 16, 18, which are spaced vertically from one another, as shown. The mask and filter section on the left hand border of the tape, as viewed in the drawing, is composed of a black opaque section 20 which is opposite the translucent colored section 12 and has an edge 22 extending slightly beyond the line of division 24 between the sections 12 and 14. Adjacent the opaque section 14 and also to the left, is an uncoated area 26 which is translucent white, characterized by the material making up the tape 4.

As shown in FIG. 3, the front face of the dial plate member 8 is provided with a vertically extending slot 28. Shown in the embodiments a–e, the slot 28 has a 0–50 scale on the left hand side thereof and a 50–100 scale on the right hand side thereof. The plate member 8 may be composed of a glass material or some such other transparent material with an opaque coating on the front face thereof. The scale, however, is uncoated thus leaving the indicia thereon as transparent figures. The various FIGURES a, b, c, d and e indicate, respectively, readings on the scale for 0, 30, 50, 75 and 100. When the tape 4 is positioned behind the dial plate member 8 and when the bar section of the tape is in line with the slot 28, the edges 16 and 18 on the tape will function as indicator marks for a range of the scale to which it is related. As shown in FIG. 3, the dotted line configurations indicate blocked out portions of the scale, whereas the full line configurations indicate lighted or illuminated portions of the scale. Thus in FIG. 3a it will be seen that the entire scale on the left hand side of the slot 28 is illuminated by means of the light source 10 because of the presence of the translucent white section 26 of the tape 4 on the left hand side of the tape directly behind the left hand side of the slot 28, whereas the black opaque portion 14 of the tape is positioned to the right of the slot 28 and consequently blocks out any light that would otherwise be transmitted through the dial plate window member 8. It will be seen that the edge 18 is lined up with the lighted portion of the scale marked zero rather than fifty, which is unlighted for the reasons above mentioned. In FIG. 3 the tape 4 has shifted upwardly with the edge 18 rising to the 30 mark. The unlighted portion of the scale extends down to the 50 mark which is now lighted because of the presence of the division line 24 between the black opaque section 14 and the translucent colored section 12. It will be seen that the zero index is now unlighted because of the presence of the black opaque section 20 on the left hand side of the tape. As the tape moves upward in response to a given rotation of the sprocket 2, as best shown in FIG. 3c, the indexing edge 16 will come within view at the lower portion of the scale and at the same time the lower right hand portion of the scale will become illuminated because of the presence of the colored translucent portion 12 directly behind the lower right hand side of the slot 28. The corresponding right hand portion of the scale will be blocked out because of the presence of the opaque section 20. It will be seen that the distance between the indexing edge 16 and the indexing edge 18 is exactly the length of the slot 28 or half the full range of the scale, namely 50. FIGS. 3d and 3e show the indexing edge 16 moving upwardly and bringing with it its extended colored translucent portion 12 to allow the scale range on the right hand side of the slot to be illuminated. The scale on the left hand side of the slot, of course, is blocked out by the presence of the black opaque section 20, as previously described.

With the above arrangement it will be seen that the tape 4 travels through a distance equal to twice the length of the dial scale and for this reason the resolution is improved by a factor of two. Owing to the pattern imprinted on the tape 4, only those segments of the scale are illuminated which are necessary to cover the range of concern. Further, a generous overlap of the sections 12 and 14 beyond their associated indexing edges 16 and 18 facilitates the transition between the ranges, and ambiguous readings are completely avoided for any position of the indexing edges 16 and 18. The sections 12 and 26 may be of different colors, for example, section 12 may be red whereas section 26 may be a bright yellow rather than white. Other colors may be utilized, of course, so long as they are distinct one from the other. The use of various colors provides the additional advantage of attracting the observer's attention to the significant or critical values of the indicated parameter on the scale range.

The tape 4 when moved behind the dial plate window member 8 may be supported in a different manner than that shown in FIG. 1, the only criterion being that the patterned section, as shown in FIG. 2, is positioned directly behind the slot 28 so as to afford the readings between 0 and 100 or some such other given range of value, as shown in FIGS. 3a–e. It is contemplated, therefore, that the tape 4 might be mounted on a transparent backing of rigid material which may be connected to an oscillating or reciprocating member the movement of which is to be measured.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. In a linear-scale indicator device, the combination comprising, a scale plate member of transparent material having an elongated slot therein, indicia positioned along each longitudinal edge of said slot, a tape member having a central axial portion positioned behind said scale member with said central axial portion in line with said slot, a source of light positioned behind said tape member, said tape member having an indicator marking means located in said central portion thereof, and translucent and opaque areas bordering each edge of said tape whereby a portion of said indicia is illuminated from said light source and another portion of said indicia is prevented from receiving illumination from said light source when said indicator means is visible through said slot.

2. In a linear-scale indicator device, the combination comprising, a transparent scale member having a longitudinal slot therein, a range of indicia positioned along each longitudinal edge of said slot, a tape member of transparent material supported for rectilinear movement positioned behind said slot, said tape member having a central axial portion aligned with said slot, a source of illumination behind said tape member, an indicator marking means on said central portion of said tape member, alternating translucent and opaque areas bordering each longitudinal edge of said tape member, whereby a portion of said range of indicia is illuminated and another portion of said range of indicia is prevented from being illuminated from said light source when said indicator means is viewable through said slot.

3. In a device according to claim 2, wherein said indicator marking means of said central portion of said tape is defined by two opposed spaced edges of an adjacent translucent and opaque area.

4. In a device according to claim 3, wherein said opposed edges are spaced a distance substantially equal to the length of said range of indicia along the longitudinal edges of said slot.

References Cited

UNITED STATES PATENTS

| | | | |
|---|---|---|---|
| 2,107,936 | 2/1938 | Gardner | 116—114 |
| 2,804,041 | 8/1957 | Neugass | 116—129 |
| 2,850,942 | 9/1958 | Stevenson et al. | |
| 3,125,985 | 3/1964 | Nallinger | 116—135 XR |
| 3,232,401 | 2/1966 | Jones | 116—133 XR |

LOUIS J. CAPOZI, Primary Examiner